US007032906B1

(12) United States Patent
Wright (10) Patent No.: US 7,032,906 B1
(45) Date of Patent: Apr. 25, 2006

(54) TOWING APPARATUS FOR RESCUE TOBOGGAN

(76) Inventor: Robert J. Wright, 67 Hayes Rd., Washington, NH (US) 03280

( * ) Notice: Subject to any disclaimer, the term of this patent is extended or adjusted under 35 U.S.C. 154(b) by 0 days.

(21) Appl. No.: 11/066,681

(22) Filed: Feb. 25, 2005

Related U.S. Application Data (60) Provisional application No. 60/549,117, filed on Mar. 1, 2004.

(51) Int. Cl.
   *B62B 17/00* (2006.01)
(52) U.S. Cl. .............................. 280/24; 280/18; 280/19
(58) Field of Classification Search ................... 280/24, 280/18, 19, 20
   See application file for complete search history.

(56) References Cited

U.S. PATENT DOCUMENTS

| 3,355,186 A | * | 11/1967 | Bradley | 280/19 |
|---|---|---|---|---|
| 3,560,013 A | * | 2/1971 | Lee | 280/19 |
| 3,721,454 A | * | 3/1973 | Anderson | 280/24 |
| 3,731,946 A | * | 5/1973 | Westcott | 280/24 |
| 3,741,578 A | * | 6/1973 | Dumont | 280/24 |
| 3,762,736 A | * | 10/1973 | Johnson et al. | 280/24 |
| 4,046,393 A | * | 9/1977 | Vadnais | 280/19 |
| 4,353,563 A | * | 10/1982 | Foster | 280/24 |
| 4,856,799 A | * | 8/1989 | Hawn | 280/24 |
| 5,306,026 A | * | 4/1994 | Jesse | 280/18 |
| 5,441,294 A | * | 8/1995 | Losier | 280/491.4 |
| 5,853,187 A | * | 12/1998 | Maier | 280/495 |
| 6,276,698 B1 | * | 8/2001 | Calandra | 280/19 |
| 6,364,324 B1 | * | 4/2002 | Buchanan | 280/15 |
| 6,588,774 B1 | * | 7/2003 | Sawatzky | 280/24 |

* cited by examiner

*Primary Examiner*—J. Allen Shriver
(74) *Attorney, Agent, or Firm*—McLane, Graf, Raulerson & Middleton, PA (57) ABSTRACT

The invention is directed to an improved towing apparatus for a rescue toboggan of a type which may be used to transport injured or incapacitated persons over snow and ice.

18 Claims, 8 Drawing Sheets

TOWING APPARATUS FOR RESCUE TOBOGGAN

CROSS-REFERENCE TO RELATED APPLICATION

This application claims the benefit under 35 U.S.C. § 119(e) of U.S. provisional application Ser. No. 60/549,117 filed Mar. 1, 2004. The aforementioned provisional application is incorporated by reference in its entirety.

FIELD OF THE INVENTION

The invention is directed to a towing apparatus and method for a rescue toboggan of a type which may be used to transport injured or incapacitated persons over snow and ice.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENT

Referring to the drawing FIGS. 1–4, a towing apparatus 10 is adapted for towing a rescue toboggan 30 over snow and ice. While the present invention is particularly suited for use in connection with a snowmobile 20 it will be recognized that the unit may be used with all manner of overland vehicles, especially those suited for traversing snow or ice, including without limitation, all terrain vehicles (ATVs), automobiles, trucks, tractors, and the like.

The rescue toboggan 30 may be of known type which includes a sled portion 34 into which a person to be transported may be placed. The sled portion 34 may contain a backboard 36. A handle assembly 32 is pivotally attached to the sled 34 and includes a pair of spaced apart handles 38, which extend generally in the longitudinal direction of the toboggan 30 in the depiction shown. In the depicted embodiment, cross braces 40 and 42 provide crosswise support of the handles 38. The distal ends 44 of the handles 38 are generally curved and preferably include handle grips 45. Other handle types are also contemplated, including handles having more severely bent or looped hand grip portions as will be described below. Likewise, distal ends 44 may include attachment loops 47 for attaching a rope handle 49 as is well known in the art.

The proximal ends 46 of the handles are secured to the sled 34 in pivoting fashion, e.g., via removable pivot pins 48. Braking chains 43 may be provided, which may be alternately raised to reduce drag and lowered to increase drag by a rescuer manually operating the toboggan down steep terrain as is generally known in the art.

The towing device 10 includes a pair of spaced apart tubular or hollow members 112 which are spaced apart a distance roughly equal to the transverse distance between the distal ends 44 of the handles 38. The tubular members are curved, bent, or angled and include a hollow channel or bore 113 adapted to receive the curved distal ends 44 of the handles 38.

The hollow members 112 are secured, at a first end, to opposite transverse ends of a base member 114, e.g., via a welded joint. The second ends of the hollow members, which are opposite the first ends thereof, are attached via an upper transverse bracing member 116, e.g., via a welded joint. A towing bar or tongue 120 is secured, e.g., via welding, to the base member 114 and is supported via angled bracing members 118, which are secured to the base member 114 and the tow bar 120, e.g., via welded joints. The towing bar 120 includes an opening 122 adapted to be releasably connected to a towing hitch of a vehicle, such as the upwardly extending pin 22 of snowmobile 20. It will be recognized that many other known types of towing, trailer or tractor hitches exist and may be employed in place of the depicted vehicle hitch 22, including without limitation, clevis-type hitches, ball and socket hitches, and so forth. Accordingly, tow bar 120 may be likewise modified so as to be complimentary and mating with the particular vehicle hitch to be employed. Although the depicted embodiments herein illustrate weld joints for fastening the frame members, it will be recognized that any one or more alternative or additional fastener types may be employed as well, including, for example, rivets, threaded fasteners, clips, clamps, clasps, dogs, pawls, and the like.

Figure 8:
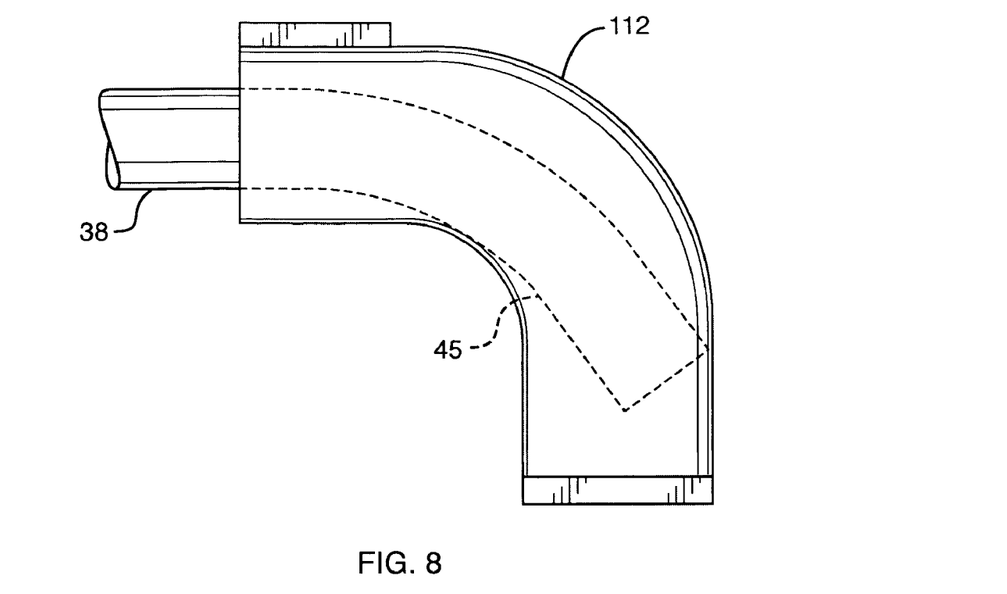
FIG. 8 is side view of the hollow member shown in the embodiment of FIG. 1, showing the position of a curved handle end received therein.

With reference now to FIG. 8, and with continued reference to FIGS. 1–4, when the tow hitch apparatus is in use, the curved handle ends 44 are inserted into the curved, bent, or angled channels 113 in the hollow members 112. A pulling force in the forward direction causes positive retention of the handle ends 44 within the channels 113.

An optional safety chain 124 (which may replaced by a rope, cable, or the like) is attached to the top brace member 16 and the cross brace 42 of the toboggan handle assembly 32 to retain the toboggan 32 in the event the handle ends 44 inadvertently disengage from the hollow members 112. The safety chain 124 may be permanently or removably secured to the towing unit 10 at a first end 126. In the depicted embodiment, the chain end 126 is permanently secured to the upper transverse member 116, e.g., via welding. The distal end 128 may be secured by wrapping the chain 124 around a cross member 40 or 42 and securing via a releasable clip 130. Other methods of securing the chain ends 126 and 128 are also contemplated.

In operation, the hitch unit 10 is simply secured to the existing snowmobile hitch 22, the handle ends are inserted into the channels 113 formed within the hollow members 112, and, preferably, the optional safety chain 124 is attached to the handle assembly 32. The depicted embodiment towing device 10 thus allows the toboggan 30 to be rapidly attached to the vehicle 20.

The present embodiment may advantageously be employed in situations wherein it may be desirable to alternate between manual operation of the rescue toboggan (e.g., by a rescuer on skis) and towing the rescue toboggan, for example, where a subject of a rescue may need to be transported over areas of varying terrain. For example, when extracting an injured skier from a mountain or hillside, it may be desirable for a ski patrol or ski rescuer to transport the subject off the hill or mountain by manually maneuvering the rescue toboggan. In the event that the subject must then be transported over an area of flat or uphill terrain, it would be desirable to tow the toboggan with a snowmobile or other vehicle.

Heretofore, the problem of navigating over varying terrain by alternating between manual navigation of the rescue toboggan and towing the toboggan has been handled in a number of ways. For example, it is known to simply employ a tow rope or chain connecting the snowmobile or other vehicle to the toboggan. This creates a problem in that the momentum of the toboggan may cause the toboggan to run into the back of the vehicle in the event the vehicle slows down or begins to traverse downhill terrain. As another alternative, the toboggan operator may sit on the back of the vehicle and hold the toboggan handles while the vehicle operator drives the operator. This creates an unsafe condition for both the rescuer and the subject. Finally, snowmobile towing hitches are known in the art which secure to the toboggan sled in place of the toboggan handles. This would require removal of the entire toboggan handle assembly 32 and replacement with a hitch apparatus in order to attach the toboggan to the vehicle for towing. The additional time required to remove the handles and replace them with a towing unit is highly undesirable since it is well understood that the speed with which an injured person is transported to a care facility is often a critical factor for the increased chance of survival or the reduction or elimination of permanent damage.

Figure 1:
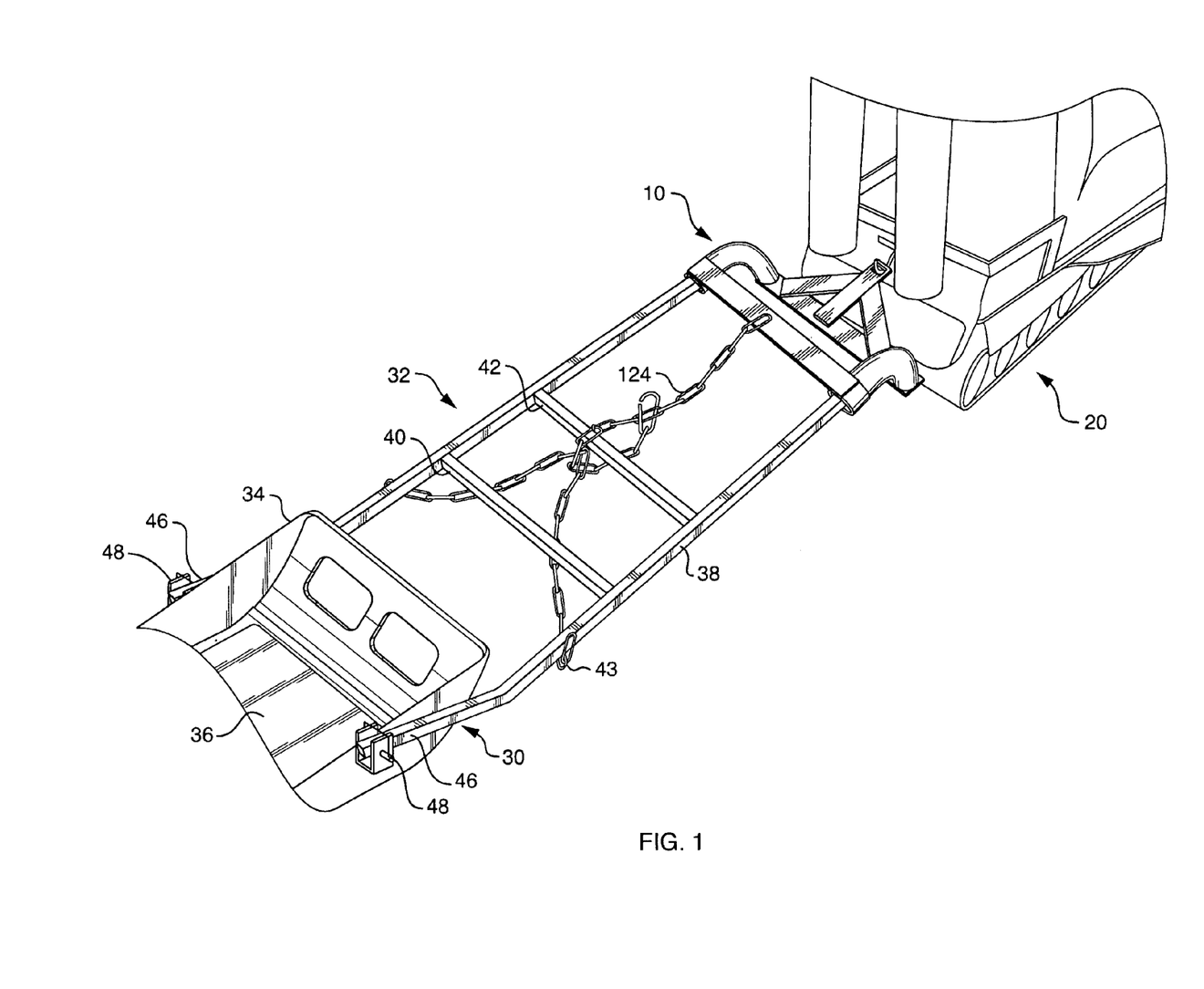
FIGS. 1 and 2 show a towing apparatus according to an exemplary embodiment of the present invention in use with a snow mobile and rescue toboggan.
Figure 2:
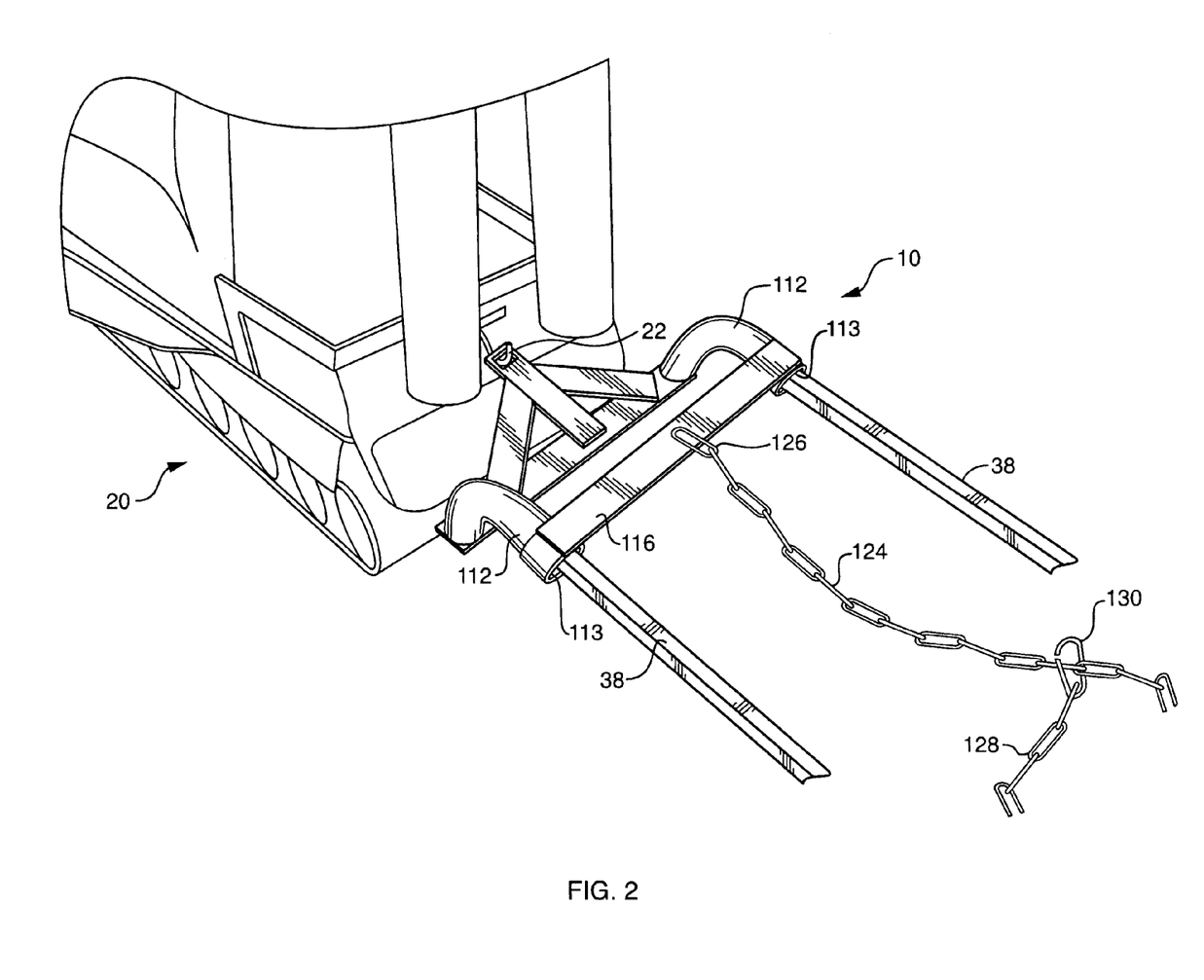
Figure 3:
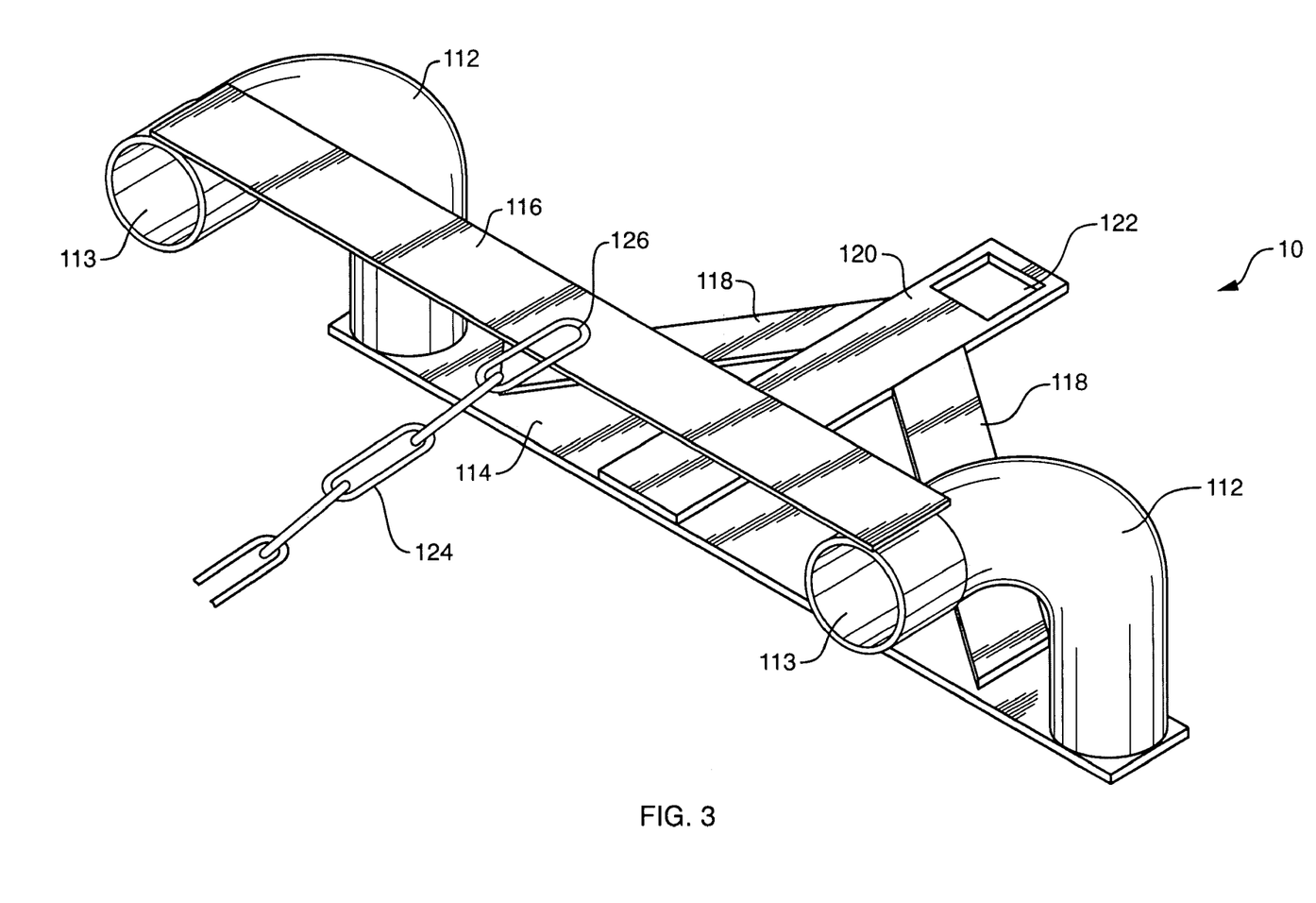
FIG. 3 is an enlarged view of the towing apparatus embodiment shown in FIGS. 1 and 2.
Figure 4:
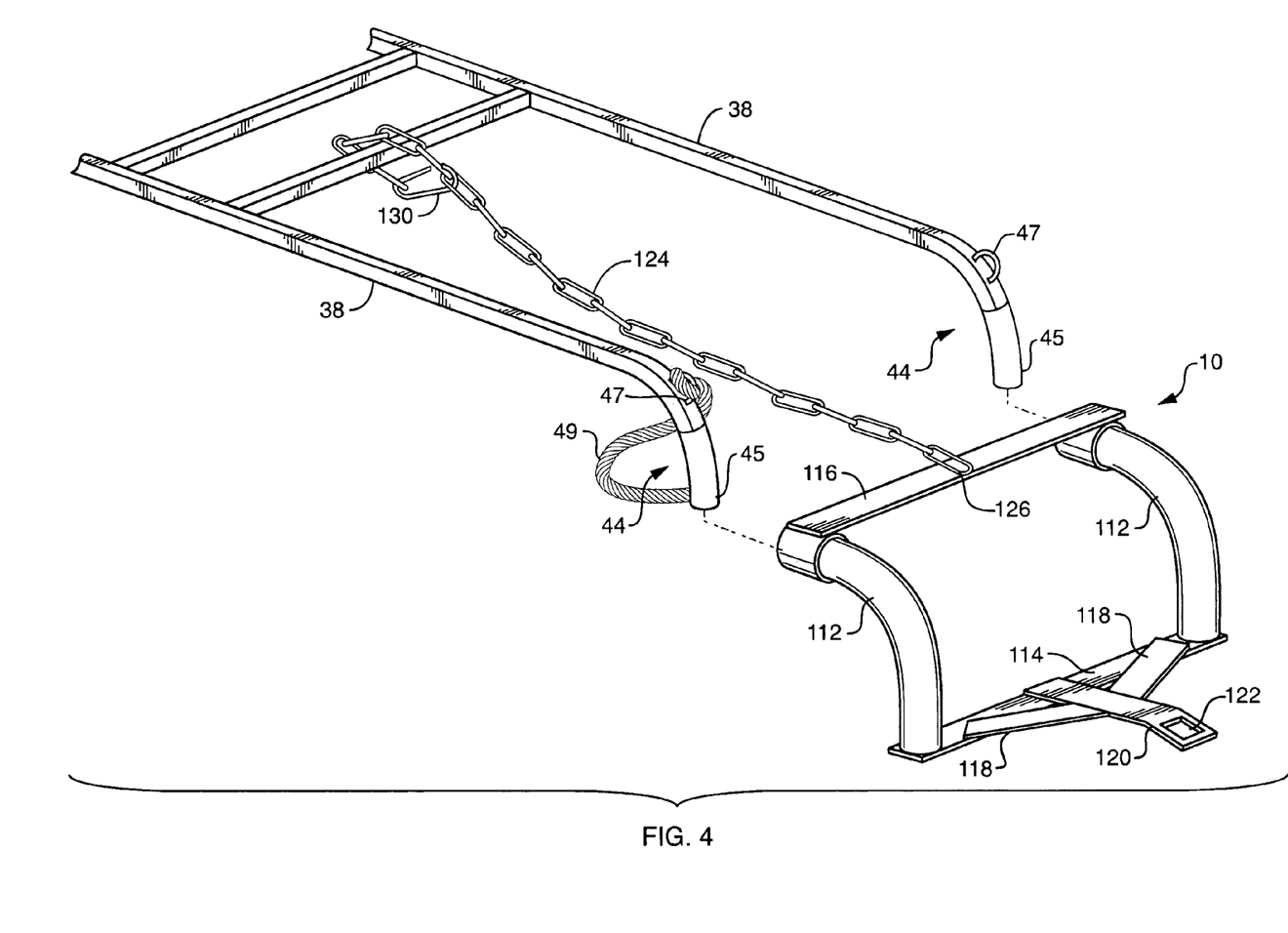
FIG. 4 illustrates the exemplary towing apparatus of FIGS. 1–3 removed from and positioned next to the rescue toboggan handles.
Figure 5:
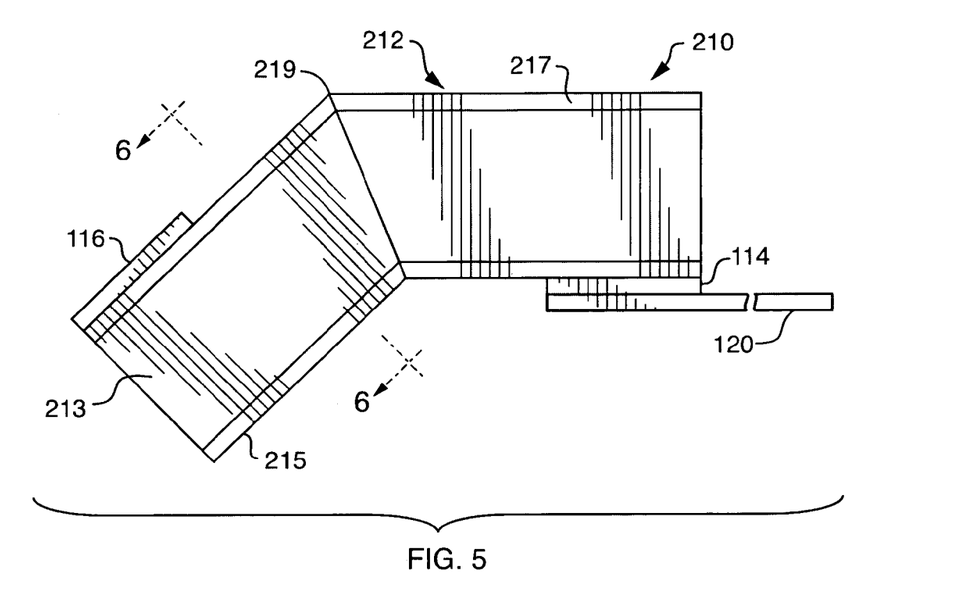
FIG. 5 is a side view of alternative embodiment employing a mitered or segmented hollow member for engaging a toboggan handle end.
Figure 6:
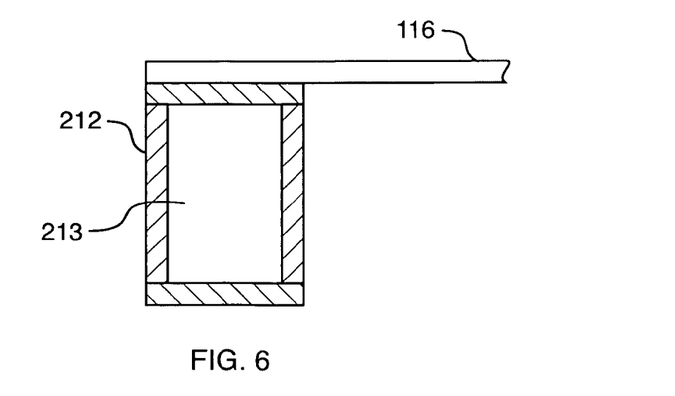
FIG. 6 is a cross-sectional view of the hollow member taken along the lines 6—6 shown in FIG. 5.

Although the towing apparatus 10 of the present invention has been shown and described primarily with reference to curved or bent tubular handle-receiving members 112 having a generally circular cross-sectional shape, other hollow handle-receiving members may be employed as well. Likewise, the embodiment above depicts hollow members which are bent or curved ninety degrees. However, other degrees of curvature are contemplated and may be varied in accordance with the toboggan handle ends to be employed. For example, in FIGS. 5 and 6, wherein like reference numerals refer to like or analogous components, a hitch apparatus 210 having alternate hollow handle-receiving members 212 is illustrated. The hollow member 212 is formed of two (or more) segments 215 and 217 of generally square or rectangular stock material. The segments 215 and 217 are mitered and joined at joint 219 (e.g., a welded joint) so as to form an interior channel 213 which will accommodate toboggan handle ends 44. In the depicted embodiment, the segments 115 and 117 form a 135-degree angle, which has been found to be advantageous for conventional curved handle ends 45 of the type shown in FIG. 4. Other angles and different numbers of segments are also contemplated, and the configuration may be adapted for various handle types.

Figure 7:
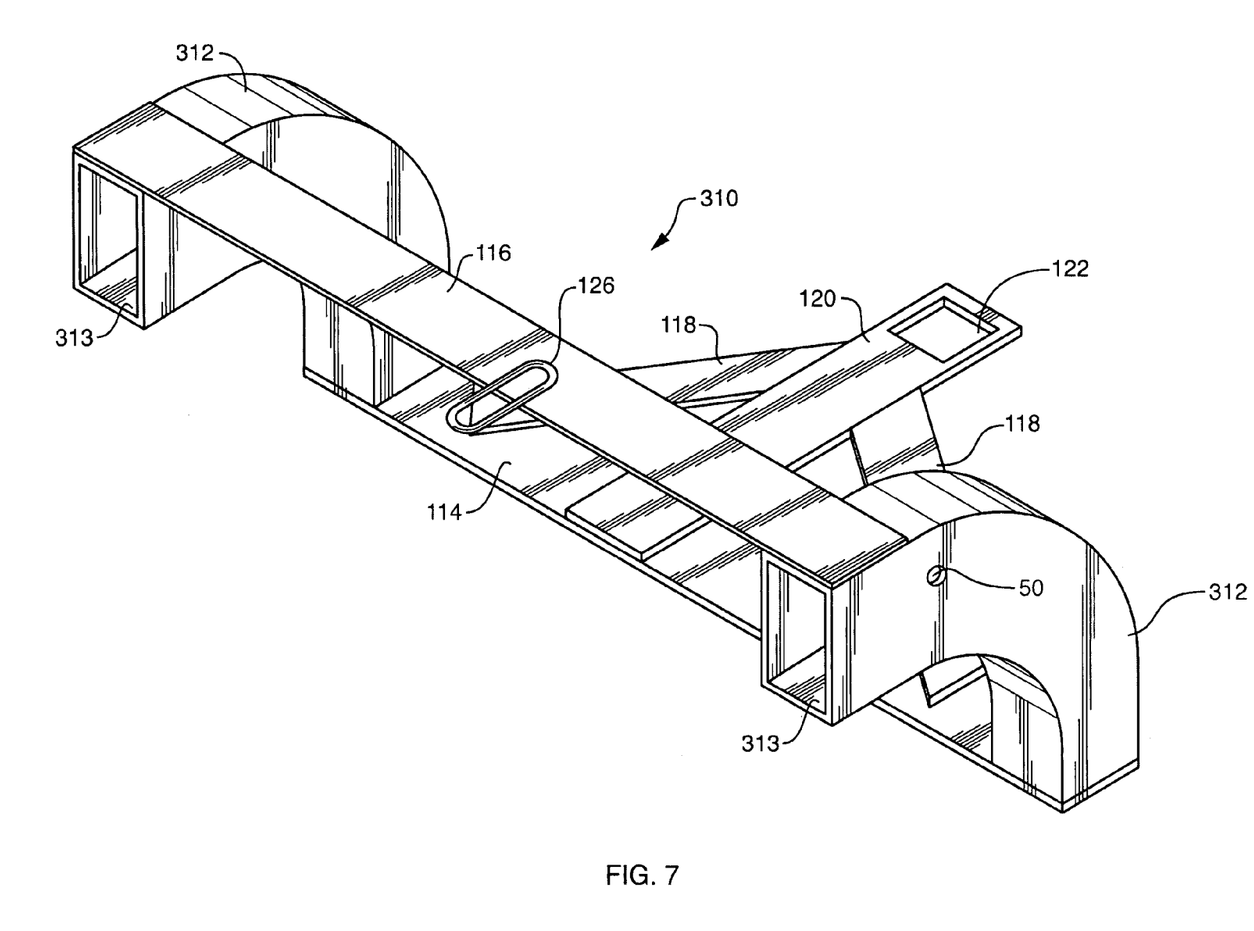
FIG. 7 depicts yet another embodiment of the towing apparatus wherein the hollow tube-receiving members are adapted to receive a retaining pin for securing an inserted toboggan handle end.

Referring now to FIG. 7, there appears a further embodiment toboggan hitch 310 comprising curved tubular portions 313 having a generally rectangular cross-sectional shape and including openings 50 in the sidewalls thereof adapted to receive a retaining pin 52. The hollow members 312 are secured at a first end to a base frame member 114 and at a second end to an upper frame member 116. A towing bar or tongue 120 is secured to the base member 114 and is supported via angled bracing members 118 as described above. The towing bar 120 includes an opening 122 adapted to be releasably connected to a towing hitch of a vehicle.

Figure 9:
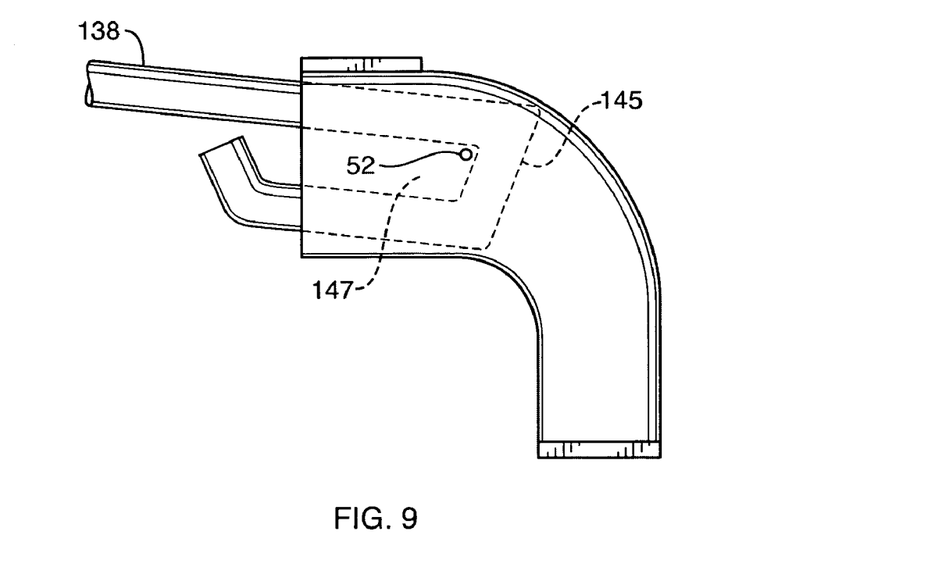
FIGS. 9 and 10 are side views of the hollow member shown in the embodiment of FIG. 7, showing the position of sharply bent or loop-type handle ends received therein.
Figure 10:
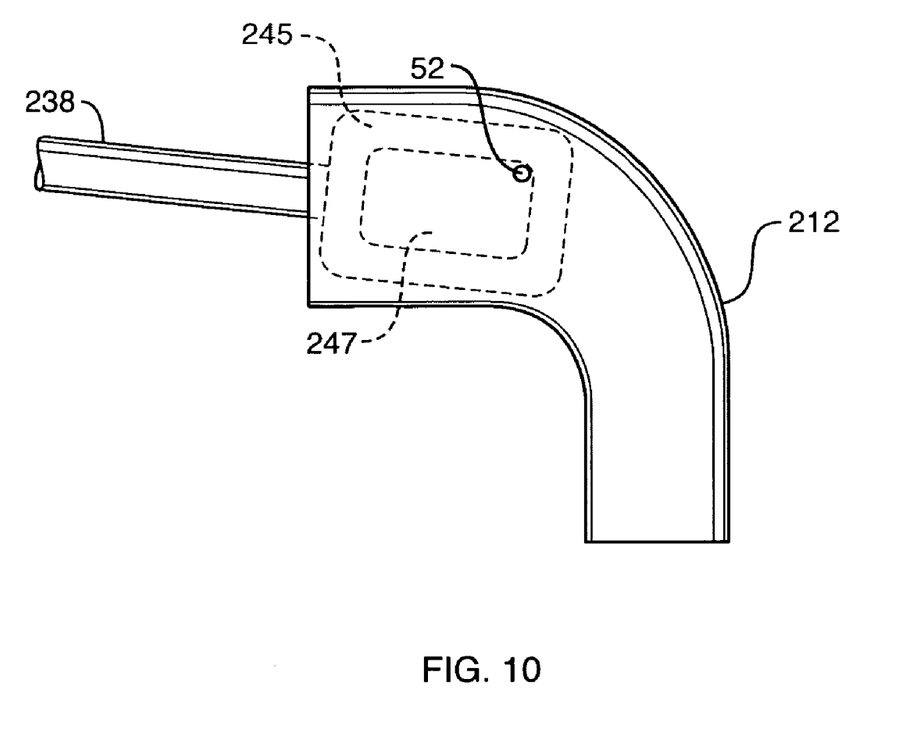

The hitch apparatus 110 may advantageously be employed with toboggan handles that include a more sharply bent or looped handle end, i.e., having opening for receiving the fingers of an operator during manual operation of the toboggan. FIG. 9 illustrates a toboggan handle 138 having a sharply bent or looped handgrip end 145 with central finger-receiving opening 147. Similarly, FIG. 10 shows a toboggan handle 245 having handgrip loop 245 with central opening 247. In operation, the handle end 145 or 245 is inserted into the interior channel 313 and the locking pin 52 is inserted through the openings 50 in the side wall portions of the tubular member 312 and central handle opening 147 or 247 and releasably secured in known fashion. Since the hollow portions 313 are curved, they may advantageously receive the curved-type handgrip ends such as handgrip ends 45 (with or without the retaining pin 52) in addition to the looped handgrip ends such as 145 and 245. It will be recognized that the curvature of the hollow members may optionally be reduced or eliminated when a retaining pin is employed to secure the handle within the hollow member, e.g., when a loop type handle is employed such as handle ends 145 and 245, or, alternatively, when a hole is otherwise provided in the handle end, e.g., a drilled hole extending transversely through the handle end or a loop secured via welding or otherwise fastened on the handle end, such as rope handle attachment loop 47 (see FIG. 4).

The invention has been described with reference to the preferred embodiments. Modifications and alterations will occur to others upon a reading and understanding of the preceding disclosure herein, whereby it is to be distinctly understood that the foregoing descriptive matter is to be interpreted merely as illustrative of the invention and not as a limitation.

The invention claimed is:

1. An apparatus for detachably securing a rescue toboggan to be towed to a hitch of a towing vehicle, the rescue toboggan being of a type having a sled portion and a pair of transversely spaced apart handles, said apparatus comprising:
   a base;
   a connector attached to said base, the connector adapted to engage the hitch of the towing vehicle;
   a first handle-receiving member attached to said base;
   a second handle-receiving member attached to said base;
   said first and second handle-receiving members being transversely spaced apart; and
   each of said first and second handle-receiving members adapted to removably receive a one of the handles of the rescue toboggan to permit towing of the rescue toboggan by the towing vehicle.

2. The apparatus of claim 1, wherein the handles are of a type having curved ends, the apparatus further comprising:
   said first and second handle-receiving members each having curved portions defining, respectively, first and second bores, each of said first and second bores for removably receiving a one of the handles; and
   said curved portions for cooperating with the curved ends of the handles to retain the handles within the tube receiving members when the toboggan is towed.

3. The apparatus of claim 1, further comprising:
  each of said first and second handle-receiving members having a first end and a second end opposite the second end;
  the first end of each of said first and second hollow members attached to said base member; and
  the second end of each of said first and second hollow members having an opening for receiving a one of the handles.

4. The apparatus of claim 3, wherein each of the first and second handle-receiving members have a generally circular cross-sectional shape.

5. The apparatus of claim 3, wherein each of the first and second handle-receiving members are angled.

6. The apparatus of claim 5, wherein each of the first and second handle-receiving members have a generally rectangular cross-sectional shape.

7. The apparatus of claim 3, wherein each of the first and second handle-receiving members have a generally rectangular cross-sectional shape.

8. The apparatus of claim 3, further comprising one or more bracing members attached to the connector and the base member.

9. The apparatus of claim 3, further comprising one or more bracing members extending between the first and second hollow members.

10. The apparatus of claim 1, further comprising a safety fastener attached at a first end to said apparatus and detachably attachable at a second end to the rescue toboggan.

11. The apparatus of claim 2, further comprising
  a first retaining pin engaging an opening in said first handle-receiving member and extending into said first bore;
  a second retaining pin engaging an opening in said second handle-receiving member and extending into said second bore; and
  said first retaining pin for engaging a one of the handles and said second retaining pin for engaging the other of the handles.

12. The apparatus of claim 11, further comprising:
  said first retaining pin for engaging a first opening formed in a one of the handles and said second retaining pin for engaging a second opening formed in the other of the handles.

13. The apparatus of claim 12, wherein the first and second openings are openings for receiving fingers of an operator during manual operation of the toboggan.

14. A method of attaching a rescue toboggan to a towing vehicle, the rescue toboggan being of a type having a sled portion and a pair of transversely spaced apart handles, said method comprising:
  providing a tow hitch apparatus, said tow hitch apparatus including: a base; a connector attached to the base, the connector adapted to engage a hitch of the towing vehicle; a first handle-receiving member attached to the base and defining a first bore; and a second handle-receiving member attached to the base and defining a second bore;
  inserting one of the handles into the first bore and the other of the handles into the second bore, said handles removably cooperating with the first and second handle-receiving members to permit towing of said rescue toboggan by said towing vehicle; and
  securing said connector to a hitch of the towing vehicle.

15. The method of claim 14, further comprising:
  operating the towing vehicle.

16. The method of claim 14, wherein the towing vehicle is a snowmobile.

17. The method of claim 14, further comprising:
  attaching a safety cable to the tow hitch apparatus and the rescue toboggan.

18. The method of claim 14, further comprising:
  removably inserting a first retaining pin through an opening in said first handle-receiving member and extending into said first bore for engaging a one of the handles; and
  removably inserting a second retaining pin through an opening in said second handle-receiving member and extending into said second bore for engaging the other of the handles.

* * * * *